(12) United States Patent
Melhirst et al.

(10) Patent No.: US 11,262,331 B2
(45) Date of Patent: Mar. 1, 2022

(54) ION MOBILITY FILTER

(71) Applicants: Owlstone Medical Limited, Cambridge (GB); Owlstone Inc., Westport, CT (US)

(72) Inventors: Daniel Melhirst, Cambridge (GB); Jonathan Pearson, Cambridge (GB); Max Allsworth, Essex (GB)

(73) Assignees: Owlstone Medical Limited, Cambridge (GB); Owlstone Inc., Westport, CT (US)

( * ) Notice: Subject to any disclaimer, the term of this patent is extended or adjusted under 35 U.S.C. 154(b) by 0 days.

(21) Appl. No.: 16/645,949

(22) PCT Filed: Sep. 10, 2018

(86) PCT No.: PCT/GB2018/052562
§ 371 (c)(1),
(2) Date: Mar. 10, 2020

(87) PCT Pub. No.: WO2019/048886
PCT Pub. Date: Mar. 14, 2019

(65) Prior Publication Data
US 2020/0278319 A1    Sep. 3, 2020

(30) Foreign Application Priority Data
Sep. 11, 2017    (GB) .................................. 1714594

(51) Int. Cl.
*G01N 27/624* (2021.01)
*H01J 49/00* (2006.01)

(52) U.S. Cl.
CPC ........ *G01N 27/624* (2013.01); *H01J 49/0031* (2013.01)

(58) Field of Classification Search
USPC .......................................................... 250/281
See application file for complete search history.

(56) References Cited

U.S. PATENT DOCUMENTS

| | | | | |
|---|---|---|---|---|
| 6,818,890 B1 * | 11/2004 | Smith | ................... | H01J 49/066 |
| | | | | 250/282 |
| 7,306,649 B2 * | 12/2007 | Boyle | ................... | B01D 53/02 |
| | | | | 436/177 |
| 7,456,394 B2 * | 11/2008 | Cameron | ............. | G01N 27/624 |
| | | | | 250/281 |

(Continued)

OTHER PUBLICATIONS

European Patent Office, International Search Report and Written Opinion, PCT/GB2018/052562, dated Dec. 7, 2018.

*Primary Examiner* — Phillip A Johnston
(74) *Attorney, Agent, or Firm* — Leveque Intellectual Property Law, PC (57) ABSTRACT

An ion filter for filtering ions in a gas sample. The ion filter has a first ion channel for filtering ions from a target chemical in the gas sample. The ion filter has a second ion channel for filtering ions from the target chemical in the gas sample. The second ion channel is separated from the first ion channel. A temperature control region is in thermal contact with the first and second ion channels for controlling a difference in temperature between the first and second ion channels. A method of filtering ions from a target chemical in a gas sample is also provided.

17 Claims, 7 Drawing Sheets

(56) References Cited

U.S. PATENT DOCUMENTS

| | | | |
|---|---|---|---|
| 7,608,818 B2* | 10/2009 | Miller | G01N 27/624 250/281 |
| 10,613,055 B2* | 4/2020 | Covey | G01N 27/624 |
| 2002/0014586 A1 | 2/2002 | Clemmer | |
| 2005/0167587 A1 | 8/2005 | Guevremont et al. | |

* cited by examiner

ION MOBILITY FILTER

TECHNICAL FIELD

The invention relates to an ion mobility filter, for example but not exclusively a field asymmetric ion mobility spectrometry filter.

BACKGROUND

Ion mobility spectrometers are used to detect particular chemicals within gases such as air. Differential mobility spectrometry (DMS) which is also known as field-asymmetric waveform ion mobility spectrometry (FAIMS) is recognised as a powerful tool for separation and characterization of gas-phase ions. Stability and repeatability of DMS spectra are important issues in the use of DMS in analytical applications, as explained for example in *"Temperature effects in differential mobility spectrometry"* by Krylov et al in International Journal of Mass Spectrometry 279 (2009) 119-125. Drift gas pressure and temperature are known to influence the field dependence of ion mobility, changing peak positions in the DMS spectra and the paper by Krylov provides a model which can be used for temperature correction of DMS Spectra.

US2005/0167587A1 describes an apparatus which supports operation of FAIMS at different temperatures to increase the separation capability of FAIMS. The apparatus comprises a FAIMS analyser having an analyser region for separating a subset of ions from the received ions and a temperature sensor for sensing the temperature within the analyser region. A temperature controller in communication with the temperature sensor controllably affects the temperature within the analyser region in response to an output signal from the temperature sensor. As explained in US2005/0167587A1 an elevation in temperature leads to peaks in a CV spectrum widening due to increased ion separation. Under such conditions, two ions that are separated at room temperature may fail to be separated at 100° C. Similarly, two ions that fail to be separated at room temperature may be separated at 10° C. The temperature of the FAIMS is maintained at a desired operating temperature and/or may be controllably changed from a first desired operating temperature to a second desired operating temperature for different separations.

The applicant has also recognised the need for an alternative solution for selectively distinguishing particular chemicals.

SUMMARY

According to the present invention there is provided an apparatus as set forth in the appended claims. Other features of the invention will be apparent from the dependent claims, and the description which follows.

We describe an ion filter for filtering ions in a gas sample, comprising: a first ion channel for filtering ions from a target chemical in the gas sample; a second ion channel for filtering the ions from the target chemical in the gas sample, wherein the second ion channel is separated from the first ion channel; and a temperature control region in thermal contact with the first and second ion channels wherein, in use, the temperature control region controls a difference in temperature between the first and second ion channels.

The ion filter may be used in a field-asymmetric waveform ion mobility spectrometry (FAIMS) and thus as explained in more detail below, the ion filter may be part of a system including a drive signal system which applies an electrical field to the ion filter. In use, the drive signal system applies an oscillating electric field known as a dispersion field together with a DC voltage which provides a compensation field to the ion filter to control ion mobility of ions in the gas sample as they pass through the ion filter. In this way, only ions of particular or target chemical species pass through the ion filter and ions of other chemical species contact the ion filter and are thus filtered out of the gas sample. Alternatively, the ion filter may be adapted to filter ion species in accordance with other known techniques. The ion filter may thus be adapted to filter an ion species by adjusting ion mobility of ions within the gas sample.

Ion mobility is typically dependent on temperature. The temperature control region controls a difference in temperature between the first and second ion channels and thus in use, the gas sample passes through the first ion channel at a first temperature and the gas sample passes through the second ion channel at a second temperature. The first temperature may be lower than the second temperature or vice versa. The temperature difference between the first and second ion channels is preferably set so as to cause a detectable difference in ion mobility of the ions of the target species as they pass through the first and second ion channels.

The ion filter may further comprise a third ion channel for filtering ions from the target chemical in the gas sample, wherein the third ion channel is separated from the first ion channel and the second ion channel. The temperature control region may be in thermal contact with the third ion channel for controlling a difference in temperature between the second and third ion channels as well as between the first and third ion channels. There may be further ion channels each having a different temperature to the other ion channels.

The first and second ion channels may be located within a single electrode layer which may be monolithic. Similarly, the third and other ion channels may be located within the monolithic electrode layer. Using a monolithic structure may mean that all ion channels can be manufactured using standard MEMS techniques. Furthermore, small ion channel widths can be achieved resulting in large electric fields within the ion channels when applying the fields using the drive signal system. By including the ion channels in the same layer, the gas sample is filtered at different temperatures simultaneously, which increases the likelihood that a correct chemical identification will occur because the likelihood of two chemicals having overlapping graphs at different temperatures is low. In this way, a single ion filter enables differences in ion mobility for ions in a single target chemical to be effected within cost-effective and speedy selective analysis.

The temperature control region may comprise a thermal insulator between the first and second ion channels. The thermal insulator may thus prevent heat transfer from the first ion channel to the second ion channel and thus thermally isolates the first and second ion channels so that the two channels are kept at different temperatures. Similarly, in an ion filter having a third (or subsequent) channel, the temperature control region may comprise a thermal insulator between each adjacent pair of channels, e.g. between the second and third ion channels.

The ion filter may comprise a continuous channel which divides the electrode layer into first and second electrode portions. The continuous channel may comprise a first ion channel portion defining the first ion channel and a second ion channel portion defining the second ion channel and a central channel portion connecting the first and second ion channel portions. Similarly, in an ion filter having a third (or subsequent) ion channel, third (and subsequent) ion channel portions may also be defined within the continuous channel. Alternatively, the ion filter may comprise a first electrode section having a first ion channel portion defining the first ion channel and a second electrode section having a second ion channel portion defining the second ion channel. Similarly, in an ion filter having a third (or subsequent) ion channel, the ion filter may comprise a third (and subsequent) electrode portion having a third (and subsequent) ion channel portion. In all arrangements, the first ion channel portion may define a plurality of first ion channels, the second ion channel portion may define a plurality of second ion channels and so on. There may be the same or a different number of ion channels within each portion number. Each of the first ion channels may have the same temperature. Each of the second ion channels may have the same temperature which is different to the temperature in the first ion channels. Similarly, in an ion filter having a third (or subsequent) ion channel, each of the third (or subsequent) ion channels may have the same temperature which is different to the temperature in the other ion channels.

In the continuous channel arrangement, the thermal insulator may be mounted to the central channel portion and is thus in direct thermal contact with both the first and second ion channel. The thermal insulator may be positioned so that in use the thermal insulator blocks flow of ions through the portion of the monolithic layer on which it is located. In the alternative arrangement, the thermal insulator may comprise a trench which divides the electrode layer into the first electrode section and the second electrode section. These arrangements provide a simple mechanical control of temperature.

The ion filter may be incorporated in a system in which gas flowing into the ion filter is heated before passing through the ion filter. The gas may heated to a number of different temperatures depending on the number of ion channels. For example, for a device having first and second ion channels, gas flowing into the first ion channel(s) may be heated to temperature T1 and the gas flowing into the first ion channel(s) being heated to temperature T2. The ion filter may comprise a first funnel portion which in use directs gas flow at temperature T1 into the first ion channel portion and a second funnel portion which in use channels gas flow at temperature T2 into the second ion channel portion. Similarly, in an ion filter having a third (or subsequent) ion channel, the ion filter may comprise a third (or subsequent) funnel portion which in use directs gas flow at temperature T3 into the third (or subsequent) ion channel portion. The thermal insulator may be located between adjacent funnel portions.

The temperature control region may comprise a heating layer mounted to the electrode layer, the heating layer comprising at least one heating element for controlling the temperature within the first and second ion channels. The combination of heating and electrode layer may be manufactured in same MEMS process as for monolithic layer. The heating layer may be mounted directly to the electrode layer or mounted to the electrode layer via an insulating layer.

The at least one heating element may be aligned with the first ion channel and the second ion channel whereby the heating element is configured to heat the first ion channel to a first temperature and the second ion channel to a second temperature. Similarly, in an ion filter having a third (or subsequent) ion channel, the at least one heating element may be aligned with the third (or subsequent) ion channel to heat the third (or subsequent) ion channel to a third (or subsequent) temperature. The heating element may be a continuous wire (e.g. tungsten) embedded in an insulating material (e.g. polymer). Alternatively, there may be a plurality of heating elements, for example the ion filter may comprise a heating element aligned at a side of each one of the first and second ion channels (and at a side of the third and subsequent ion channels where needed).

The first ion channel may be defined between a first pair of electrodes and the second ion channel may be defined between a second pair of electrodes. Similarly, the third and subsequent ion channels may be defined between a corresponding pair of electrodes. These pair of electrodes may be in the form of interdigitated electrode fingers. The first heating element may be aligned (e.g. overlap) with one of the first pair of electrodes and the second heating element may be aligned (e.g. overlap) with one of the second pair of electrodes. There may be heating elements aligned with each of the electrodes. By aligning the heating elements with the individual electrodes, it may be possible to control the temperature within each individual ion channels separately.

The ion filter may comprise a second heating layer on an opposed side of the electrode layer to the heating layer. The second heating layer may be similar to the first heating layer and thus the second heating layer is configured to heat the first ion channel to a first temperature and the second ion channel to a second temperature. Both heating layers may be controlled to ensure that the temperature along each ion channel is constant. Alternatively, the heating layers may be operated at different temperatures to create a thermal gradient within an ion channel although it is noted that the resulting spectrum is likely to be more difficult to analyse. By keeping the temperature along each channel constant, there is a level of discretisation which means that it is likely to be easier to perform subsequent analysis.

The ion filter may comprise a plurality of ion channels between the first ion channel and the second ion channel wherein the temperature control region comprises a first heater mounted adjacent the first ion channel to heat the first ion channel to a first temperature and a second heater mounted adjacent the second ion channel to heat the second ion channel to a second temperature. The first and second heaters may thus create a thermal gradient across the ion filter with each of the ion channels having a different temperature. In this way, many ion channel temperatures are possible but only two temperatures need to be controlled. The first and second heaters may be incorporated in the heating layer(s) described above.

The ion filter may comprise a first electrode layer having the first ion channel and second electrode layer having the second ion channel wherein the temperature control region comprises a thermal insulator between the first electrode layer and the second electrode layer. In use, the gas flows first through the first ion channel and then through the second ion channel. The first and second ion channels filter the same ion flow in series. In an arrangement having a third or subsequent ion channel, the ion filter may comprise a third or subsequent ion electrode layer with each electrode layer separated by a thermal insulator. Although the sample is not measured at different temperatures simultaneously in this arrangement, a single ion filter still allows multiple different temperatures to be measured in a simple manner.

As set out above, the described ion filters may be incorporated in a spectrometry system and thus we also describe an ion mobility spectrometry system comprising: an ion filter as above; an ionizer for generating the ions with the gas sample; and a detector for detecting the output from the ion filter. The detector may comprise a detecting element, e.g. a pair of detector electrodes, for each ion channel.

The system may comprise a processor configured to generate a graphical output for each ion channel; the graphical output may be based on information, e.g. ion current, which is detected by the detector. By generating a graphical output for each ion channel, an output for the target chemical is produced at two different temperatures. This may aid identification of the target chemical. The processor may be configured to generate a measurement of ion current at the detector as a function of an applied dispersion field and an applied compensation field for each ion channel. The system may thus comprise a drive signal system for applying the dispersion field and the compensation field. It will be appreciated that by using a detector which comprises a separate detecting element for each ion channel that such an output may be more easily generated but the processor may be configured to generate the output from a different style of detector.

It will be appreciated that the ion filter described above can also be used to filter ions. Thus, we also describe a method of filtering ions from a target chemical in a gas sample, the method comprising: passing the gas sample through a first ion channel for filtering ions from a target chemical in the gas sample; passing the gas sample through a second ion channel for filtering ions from the target chemical in the gas sample, wherein the second ion channel is separated from the first ion channel and is at a different temperature to that of the first ion channel.

The gas sample may be passed through the first and second ion channels simultaneously. Alternatively, the gas sample may be passed through the first and second ion channels sequentially. The method may also incorporate the features described above in relation to the ion filter.

We also describe a method of detecting ions from a target chemical in a gas sample, the method comprising: ionizing the gas sample to create ions of the target chemical; filtering the ions as described above; and detecting the ions that output from the filter using a detector. The method may also incorporate the features described above in relation to the system.

BRIEF DESCRIPTION OF THE DRAWINGS

For a better understanding of the invention, and to show how embodiments of the same may be carried into effect, reference will now be made, by way of example only, to the accompanying diagrammatic drawings in which:

FIG. 1b is a schematic illustration of a channel within an ion filter in the system of FIG. 1a;

FIG. 1c is an alternative schematic illustration of the spectrometry system of FIG. 1a;

DETAILED DESCRIPTION OF THE DRAWINGS

Figure 1A:
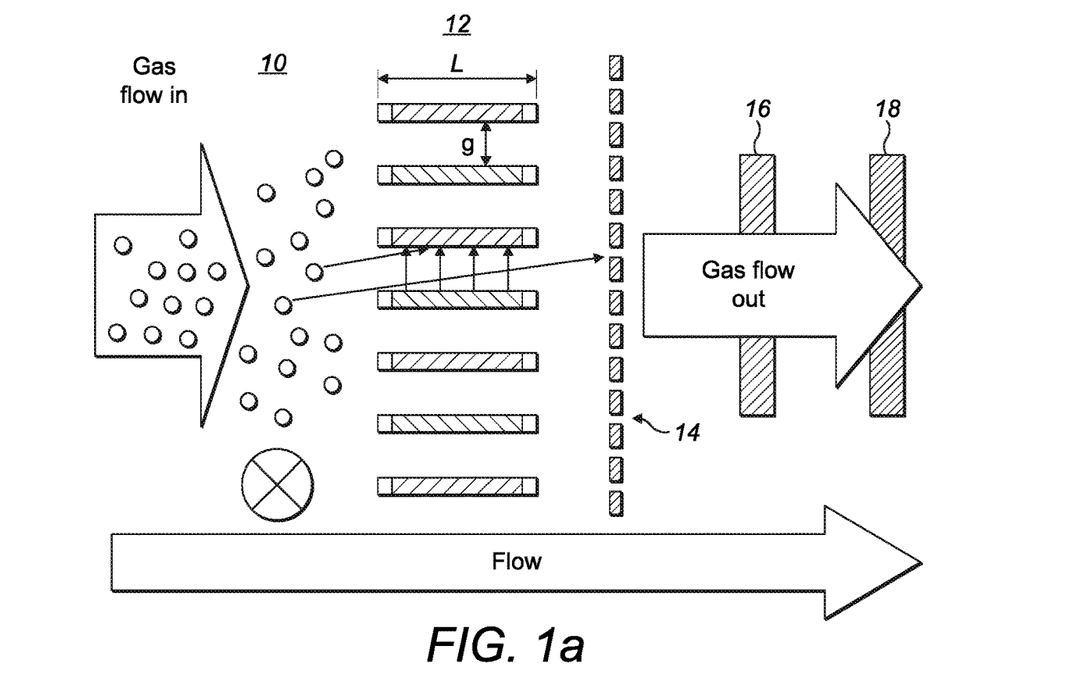
FIG. 1a is a schematic illustration of a spectrometry system.

FIGS. 1a to 1d shows a schematic illustration of a spectrometry system which may be a miniature device as described in "Characterisation of a miniature, ultra-high field, ion mobility spectrometer" by Wilks et al published in Int. J. Ion Mobil Spec. (2012) 15:199-222. As shown in FIG. 1a, gas flows into an ionizer 10 and the generated ions then pass through an ion filter 12. The ion filter separates the ions and may thus be termed an ion separator. In the illustrated example, the ion filter has a plurality of ion channels each having a small gap width (g of around 30 to 50 µm) and relatively short length (e.g. L around 300 µm). The gap surfaces are made of high-conductivity silicon (or similar material) and are electrically connected via wire bonding to metal pads on the face of the silicon. Ions exiting from the ion separator are detected by an ion detector 14. It is known that temperature and pressure can affect the results and thus a temperature sensor 16 and/or a pressure sensor 18 may also be included in the system. These are shown schematically on the output gas flow but could be incorporated into another appropriate location within the device.

Figure 1B:
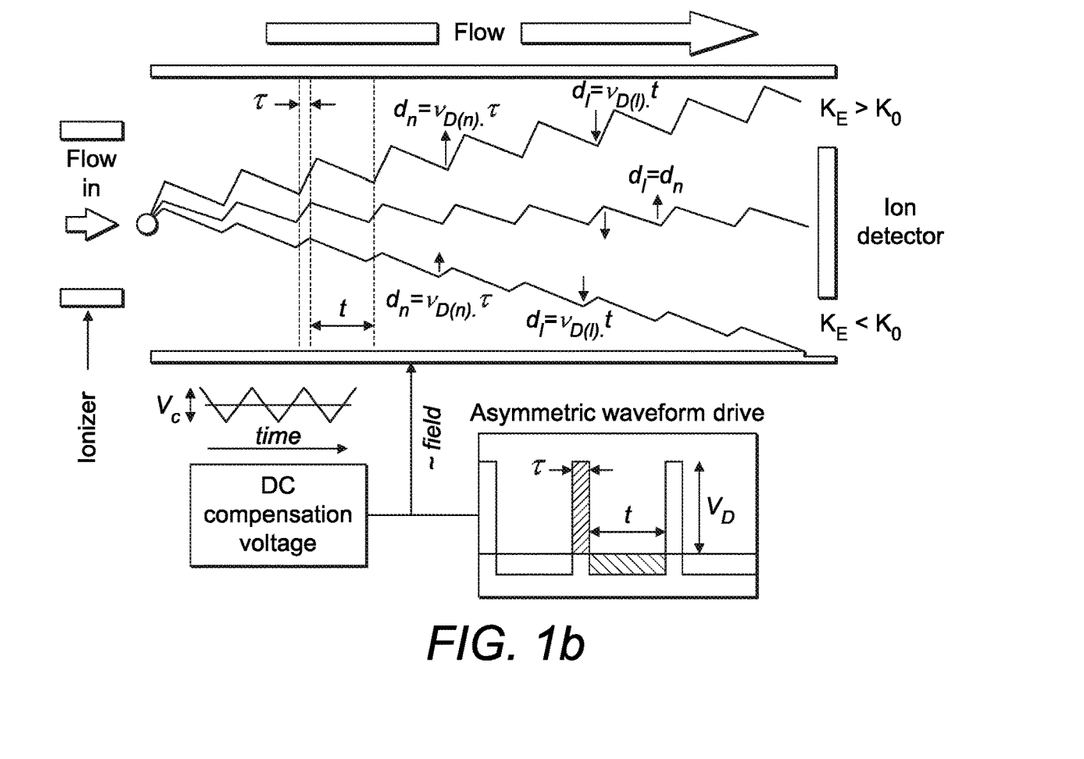

As shown in FIG. 1b, an oscillating electric field is applied to the ion separator. A variable high-voltage asymmetric waveform of low voltage pulse duration t(s) and high voltage pulse duration τ(s) and peak voltage $V_D$ is applied to create the variable field of $V_D/g$ (kVcm$^{-1}$). The mobility of each ion within the ion separator oscillates between a low-field mobility $K_0$ and a high-field mobility $K_E$ and the difference between the high-field mobility and low field mobility is termed ΔK. Ions of different chemicals will have different values of ΔK and the ions adopt a net longitudinal drift path length ($d_h$-$d_l$) through the ion filter which is determined by their high and low field drift velocity ($v_{D(h)}$ and $v_{D(l)}$) and the high field and low field pulse durations. Only ions in a "balanced" condition such as the middle ion in FIG. 1b will exit from the ion separator and be detected by the ion detector. Ions which contact either of the sides of the ion channel will not be detected. A bias DC "tuning voltage" ($V_C$) is applied on top of the applied waveform to enable subtle adjustment of the peak voltage $V_D$ to counter the drift experienced by an ion of a specific ΔK.

Figure 1C:
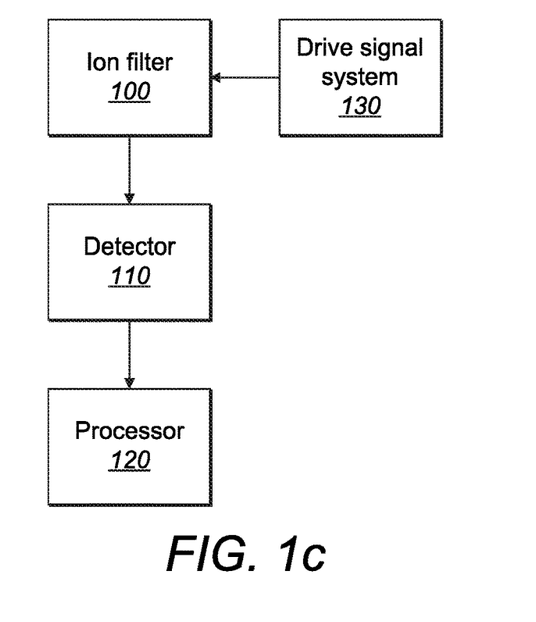
Figure 1D:
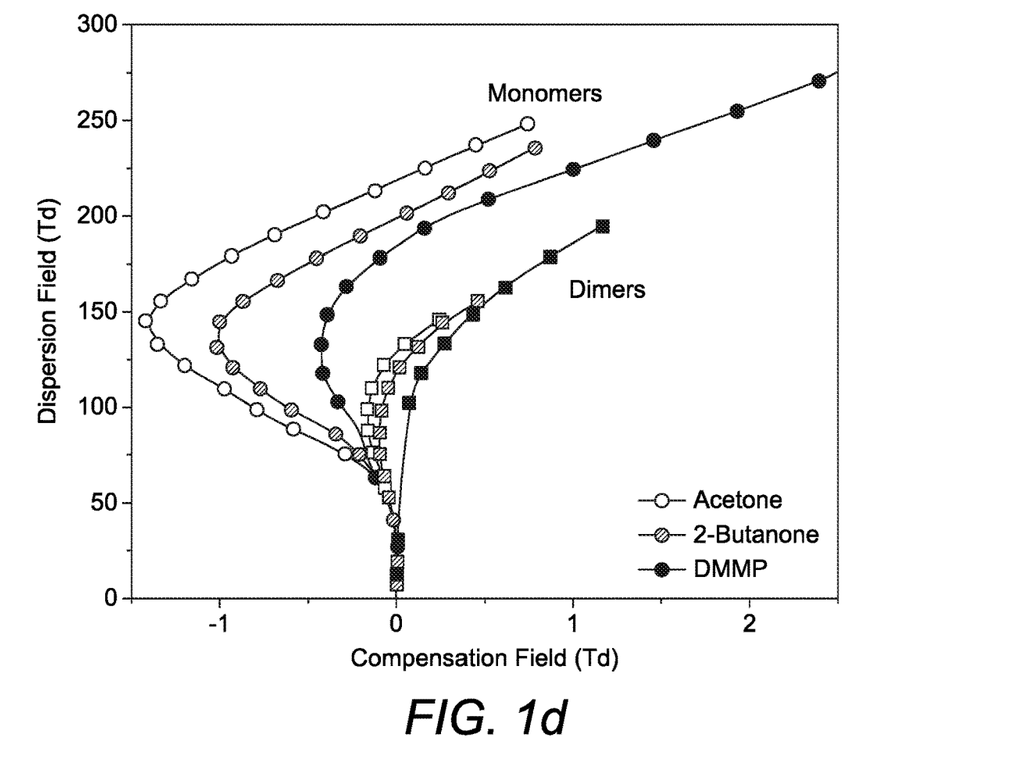
FIG. 1d is an example of the output from the system of FIG. 1c.

As shown schematically in FIG. 1c, a drive signal system 130 applies the asymmetric waveform and the tuning voltage to the ion filter 100 as described above. The output ions from the ion filter 100 are detected by the detector 110. The output from the detector 110 is sent to a processor 120 which may be local (i.e. within the ion filter) or remote (i.e. in a separate computer/server). The processor is adapted to extract numerical parameters which facilitate chemical detection, identification, classification and/or quantification of the ions. For example, the processor may be configured to generate an output as shown in FIG. 1d in which the measurement of ion current at the detector is plotted as a function of the applied electric field resulting from the asymmetric waveform which is known as the dispersion field $E_D$ (kVcm$^{-1}$) and the applied electric field resulting from the DC voltage which is known as the compensation field $E_C$ (kVcm$^{-1}$). The spectral output may alternatively be presented as an m×n matrix of ion current measurements at m compensation field and n dispersion field settings.

FIG. 1d shows the $E_C$:$E_D$ peak trajectories for monomer and dimers of acetone, 2-butanone and dimethyl methyl phosphonate (DMMP). These trajectories are used to identify whether ions of a particular chemical are present in a gas sample by comparing the resulting graph with previously collected graphs of known chemicals generated under the same conditions. However, as illustrated in FIG. 1d, the graphs for some chemicals are similar and thus identification is more difficult when the differences are less pronounced. This is particularly true for relatively large molecules which tend to cluster together when FAIMS is operated at room temperature.

As explained in the background section, temperature is a factor which affects the output from the filter. At higher electric fields (such as those used in FAIMS), ions acquire substantial energy from the field and the frequency and strength of the ion-neutral interaction changes. As a result the mobility coefficient $K_E$ at fixed bulk gas temperature becomes dependent on the electric field as shown:

$$K_E = K_0\{1+\alpha(E_D)\}$$

Where $K_0$ is the mobility coefficient under low field conditions, $\alpha(E)$ is a non-dimensional function characterising the field mobility dependence (called the alpha function) and $E_D$ is the dispersion field. Temperature affects the ion mobility in two ways, namely by changing gas density, N. In addition, gas temperature changes the ion and neutral kinetic energy distributions and hence changes the distribution of ion-neutral collision energies and the ion mobility. The effective temperature of an ion $T_{eff}$ may be defined as:

$$T_{eff} = T + \frac{\zeta M K_0^2 N_0^2 \left(\frac{E_D}{N}\right)^2}{3k_b}$$

where T is the neutral gas temperature (i.e. the temperature in the absence of an electric field), $\zeta$ is the ion-neutral collision efficiency factor, M is the molecular weight of the drift gas, $K_0$ is the mobility coefficient under low field conditions, $N_0$ is the standard gas density, $E_D/N$ is the dispersion field in Townsend, N is the gas density and $k_b$ is Boltzmann's gas constant.

Figure 2A:
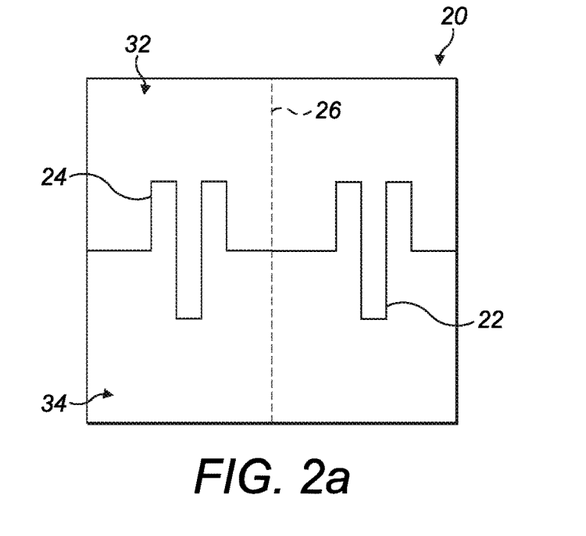
FIGS. 2a and 2b show cross-sectional and plan views respectively of a first ion filter.
Figure 2B:
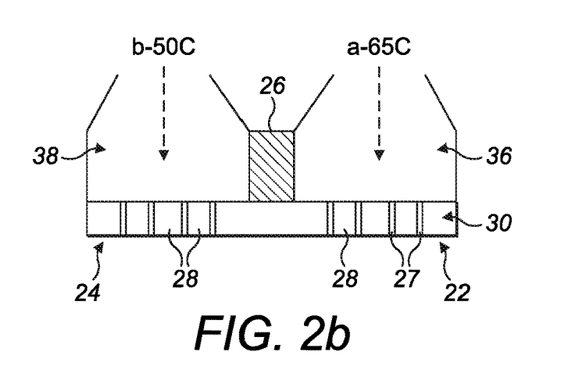

As shown above, the effective temperature of an ion $T_{eff}$ is a factor of both the temperature in the absence of an electric field and the electric field. FIGS. 2a and 2b are schematic illustrations of an ion filter 20 which can be incorporated in the systems shown in FIGS. 1a to 1d. In this arrangement, the ion filter 20 comprises a monolithic electrode layer 30. The continuous channel separates the ion filter into first and second electrode portions 32, 34. The channel comprises a first ion channel portion 22 and a second ion channel portion 24 separated by a central channel portion. As shown more clearly in FIG. 2b, each of the first and second ion channel portions comprises a plurality of ion channels 27 through which ions flow. An insulator 26 is mounted to the monolithic electrode layer above the central channel portion. In this way, the insulator 26 is in thermal contact with both the first ion channel portion 22 and the second ion channel portion 24.

Ions flow through a first funnel portion 36 into the first ion channel portion 22 and through a second funnel portion 38 into the second ion channel portion 24. The funnel portions 36, 38 may be incorporated in the ionizer of the system above or may be between the ionizer and the ion filter. Ions flowing through the first funnel portion 36 are heated to a first temperature, for example a=65° and ions flowing through the second funnel portion 38 are heated to a second different temperature, for example b=50°. A heater may be incorporated into each funnel portion or the heater may be downstream from each funnel portion so that the ions are heated before entering the funnel portion, e.g. on exiting the ionizer. The insulator 26 is between the first and a second funnel portion 36, 38 and thermally insulates the first and second funnel portions from one another. The insulator 26 thus acts as a temperature control region which ensures that the difference in temperature between the gas samples in the first and second ion channel portions is maintained.

As set out above, the effective temperature of an ion is dependent on the gas temperature and thus the ion mobility for the ions passing into each of the first and second channel portions will be different even though the same dispersion field is being applied to both portions. The same compensation field is also applied to both channel portions and since the aim is to detect the same chemical using both portions, the compensation field will need to be selected carefully to ensure that the ions of the particular chemical to be detected, i.e. the correct ions species, are "balanced" and are output from both the first and second ion channels despite the differences in temperature.

Figure 2C:
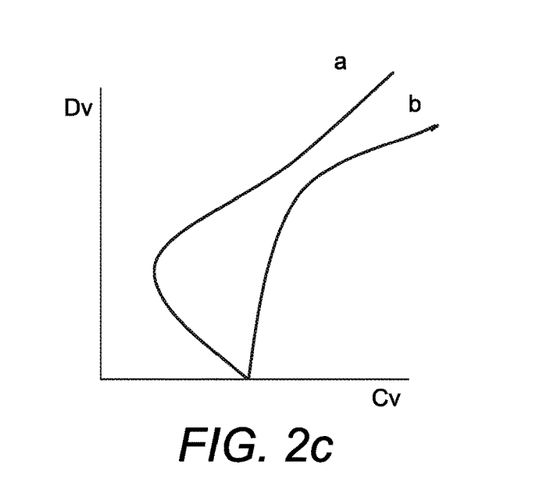
FIG. 2c shows a spectrum obtained using an ion filter.

FIG. 2c shows an example output from the filter of FIGS. 2a and 2b. The ion current is plotted as a function of both the compensation and dispersion fields for both the first and second ion channel portions. FIG. 2c shows a clear difference between the graphs at the first temperature a and the second temperature b. These two graphs can then be matched with known graphs collected under the same conditions to detect and identify a particular chemical. By measuring ions at two different temperatures simultaneously, this increases the likelihood that a correct chemical identification will occur because the likelihood of two chemicals having overlapping graphs at two different temperatures is low. Furthermore, running at two different temperatures simultaneously is more efficient than operating the system twice, once at each temperature and thus the chemical identification process is less time consuming.

In this illustration, both ion channel portions are serpentine and each defines three interdigitated electrodes 28. It will be appreciated that the number of electrodes 28 shown is merely illustrative and a different number may be used. Similarly, it will be appreciated that different shapes of ion channel may also be used. Furthermore, whilst the complexity of the device would be increased, it will be appreciated that more than two channel portions could be used provided adjacent portions were insulated from each other as described above. By incorporating interdigitated electrodes, the ion filter may have high ion channel density and large electric fields.

Figure 3A:
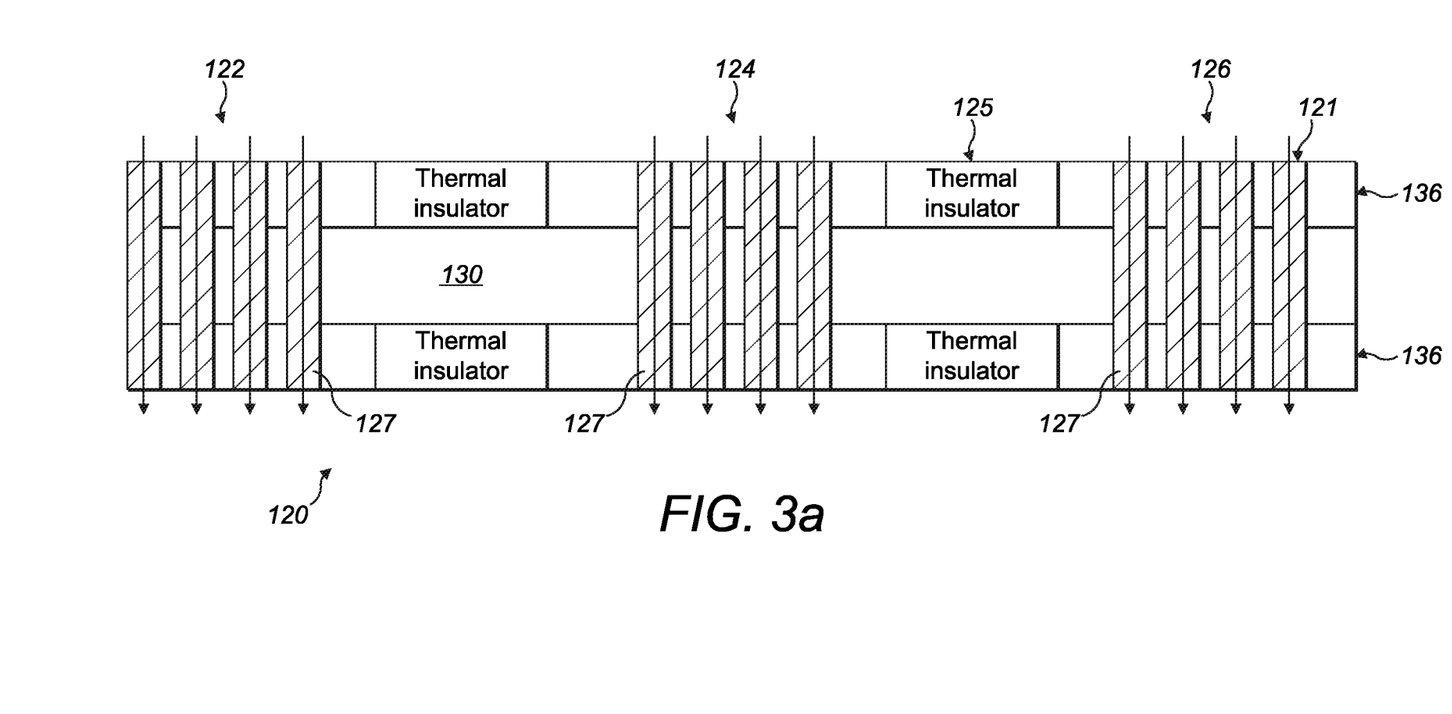
FIGS. 3a and 3b show cross-sectional and plan views respectively of a second ion filter.
Figure 3B:
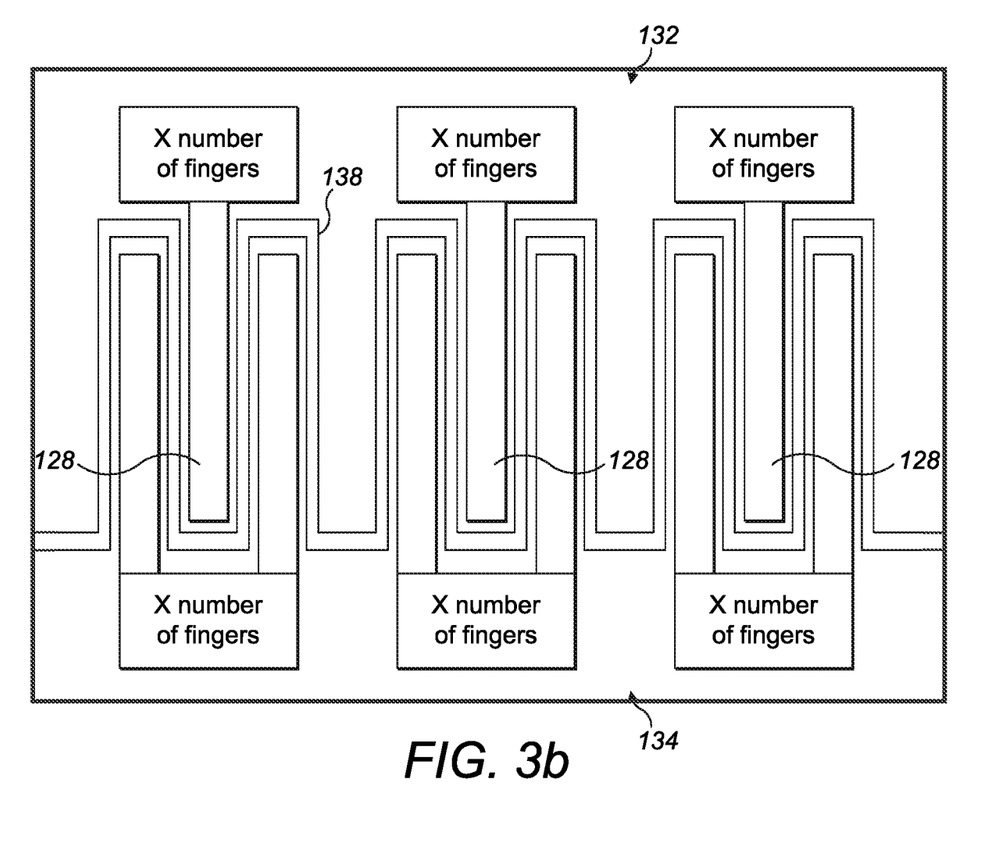

FIGS. 3a and 3b show an alternative version of an ion filter which can be incorporated in the system of FIGS. 1a to 1d. In contrast to the arrangement shown in FIGS. 2a and 2b, there is direct heating of the ion filter rather than heating of the ions before entering the ion filter. As shown in FIGS. 3a and 3b, the ion filter 120 comprises an electrode layer 130 having a continuous channel 121 which separates the ion filter into first and second electrode portions 132, 134. The continuous channel comprises a first ion channel portion 122, a second ion channel portion 124 and a third ion channel portion 126 separated by first and second intermediate channel portions respectively. As in the previous embodiment, the ion channel portions are serpentine and each defines three interdigitated electrodes 128 which extend as fingers from either of the first or second electrode portions. There are a plurality of ion channels 127 in each of the first, second and third ion channel portions through which ions flow as schematically illustrated by the arrows.

It will be appreciated that any number of fingers (interdigitated electrodes) and/or channels can be used. Moreover, in the arrangement, the same number of electrodes and channels are present in each portion but this need not be the case.

At least one heating layer 136 is mounted to the electrode layer 130 and as shown in this example, a heating layer 136 is mounted to both surfaces of the electrode layer 130. The heating layer is more clearly shown in FIG. 3b. In this embodiment, the heating layer comprises a heating element 138 in the form of a tungsten (or similar) wire which is embedded in a polymer layer. The heating element 138 has a shape which matches the shape of the ion channel, in this case a serpentine shape. Accordingly, the heating element 138 sits within the gap between each electrode. Each heating layer 136 comprises a pair of thermal insulators 125; one between each pair of ion channel portions. In this arrangement the thermal insulators 125 are embedded in the polymer layer. They are thus in indirect thermal contact with each of the pairs of ion channel portions via part of the polymer layer.

The heating element 138 heats the first ion channel portion 122 to a first temperature. The second ion channel portion 124 is heated to a second temperature and the third ion channel portion 126 to a third temperature. The first temperature is lower than the second temperature which is itself lower that the third temperature and thus the temperatures may be termed low, moderate and high respectively. By measuring ions at three different temperatures simultaneously, this increases the likelihood that a correct chemical identification will occur because the likelihood of two chemicals having overlapping graphs at three different temperatures is low. The use of a single heating layer should provide the required difference in temperature between each ion channel portion and may provide a consistent temperature through the entire depth of the channel (i.e. from one face of the electrode layer to the other). However, the use of a heating layer on both surfaces of the electrode layer should ensure that the ion channel has a consistent temperature through the entire depth of the channel (i.e. from one face of the electrode layer to the other).

Figure 3C:
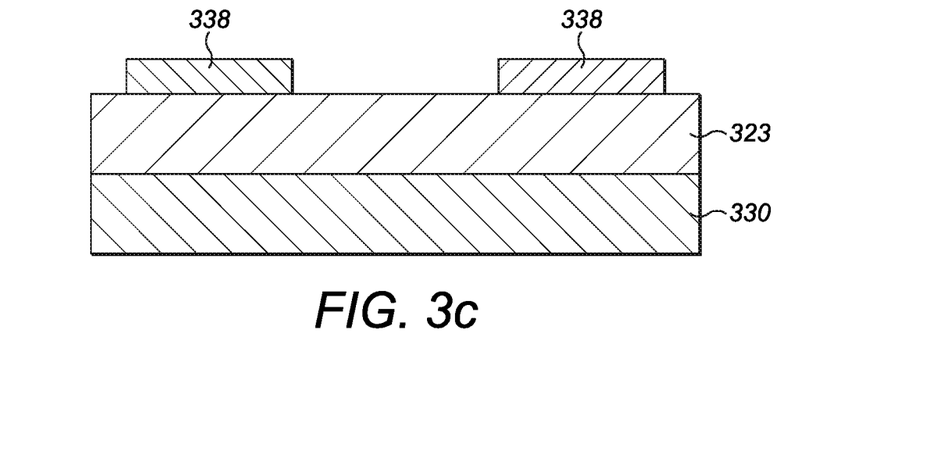
FIG. 3c show a cross-sectional view of a variation of the second ion filter.

As an alternative to the embedded heating element, each heating layer may comprise a flexible PCB with coated heating elements which are aligned with the electrodes and ceramic (or similar material) thermal insulator(s) between each ion channel portion. A schematic representation of this arrangement is shown in FIG. 3c in which an insulating layer 325 is adjacent an electrode layer 330 in which the ion channels and electrodes may be formed as described above. The heating elements 338 are mounted on the insulating layer 323. Alternatively, thin film resistive heating coatings may be applied to each surface of the electrode layer overlapping the electrodes. Each coating may be set at a different level for each ion channel portion.

Figure 4A:
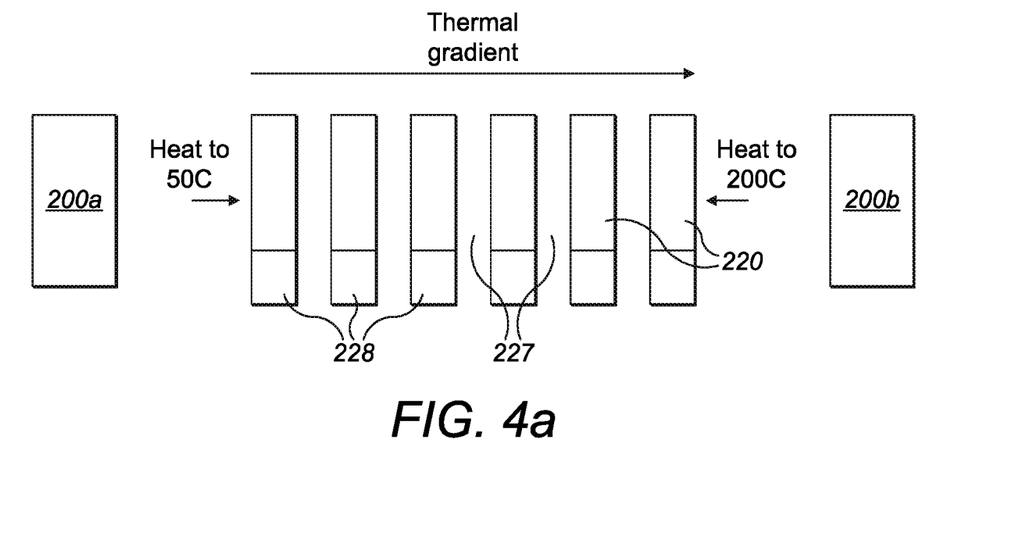
FIGS. 4a and 4b shows cross-sectional views of two variations of another ion filter.
Figure 4B:
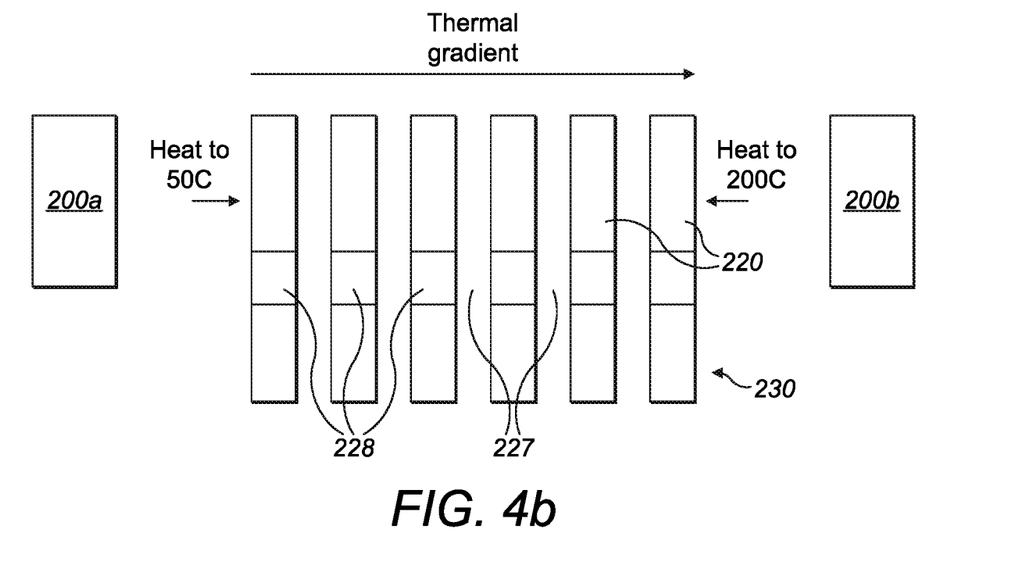

FIGS. 4a and 4b show an alternative design of ion filter comprising an electrode layer having a plurality of electrodes 228 with an ion channel between each pair of electrodes. The plurality of electrodes 228 may be formed as explained in relation to FIGS. 2a to 3b, e.g. an interdigitated set of electrodes. The electrode layer is supported on a substrate 220 which supports the electrodes and maintains the gap width of each ion channel. A substrate may be incorporated in the other embodiments as needed. As shown schematically, a heater 200a, 200b is positioned on each side of the ion filter. A first heater 200a heats one side of the ion filter to a first relatively low temperature, e.g. 50° and a second heater 200b heats the opposed side of the ion filter to a second relatively high temperature, e.g. 200°.

The presence of two heaters means that there is a thermal gradient across the ion filter which increases from 50° through to 200°. Accordingly, each ion channel 227 has a different temperature. The two heaters together with the thermal properties of the ion filter thus effectively form a temperature controller which controls a difference in temperature between the gas samples in each ion channel. The resulting $E_C:E_D$ spectrum comprises a peak trajectory for each temperature. This may be measured by a single detector layer which is able to correctly identify the ion current output from each ion channel. Alternatively, as shown in FIG. 4b, the detector layer 230 may comprise a plurality of detectors, each adjacent an electrode to detect the ion current output from each ion channel.

Figure 5:
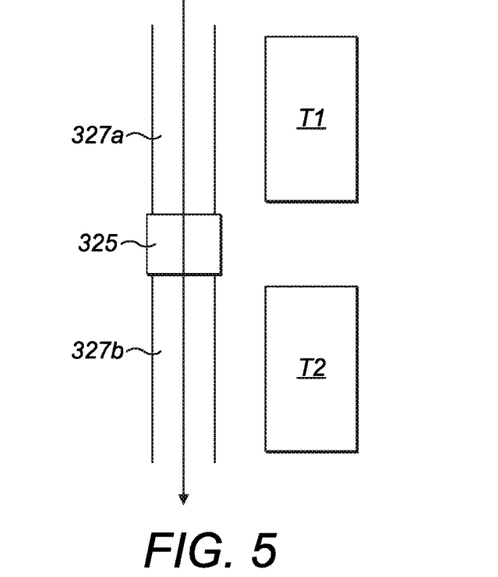
FIG. 5 shows a partial cross-sectional view of another ion filter.

In each of the embodiments of FIGS. 2a to 4b, the ion channels are arranged side-by-side so that the ions flow through at the same time. FIG. 5 shows an alternative arrangement in which ion channels are arranged in tandem, i.e. the ions first flow through a first ion channel 327a and subsequently through a second ion channel 327b. For simplicity only a single pair of ion channels is shown but it will be appreciated that a plurality of ion channels may be arranged in tandem, for example by layering two electrode layers such as those used in other embodiments. The first ion channel is heated by a first heater to a first temperature T1 and the second ion channel is heated by a second heater to a second temperature T2. T1 may be lower than T2 or vice versa. The two temperatures are selected to provide a resulting $E_C:E_D$ spectrum having two separate graphs which enable the desired chemical to be identified by the system. The heaters are shown schematically to one side of each channel but may be any suitable form of heating. A thermal insulator 325 is positioned between the channels. The thermal insulator in combination with the heaters form a temperature controller which controls a difference in temperature between the gas samples in the first and second ion channels.

Figure 6:
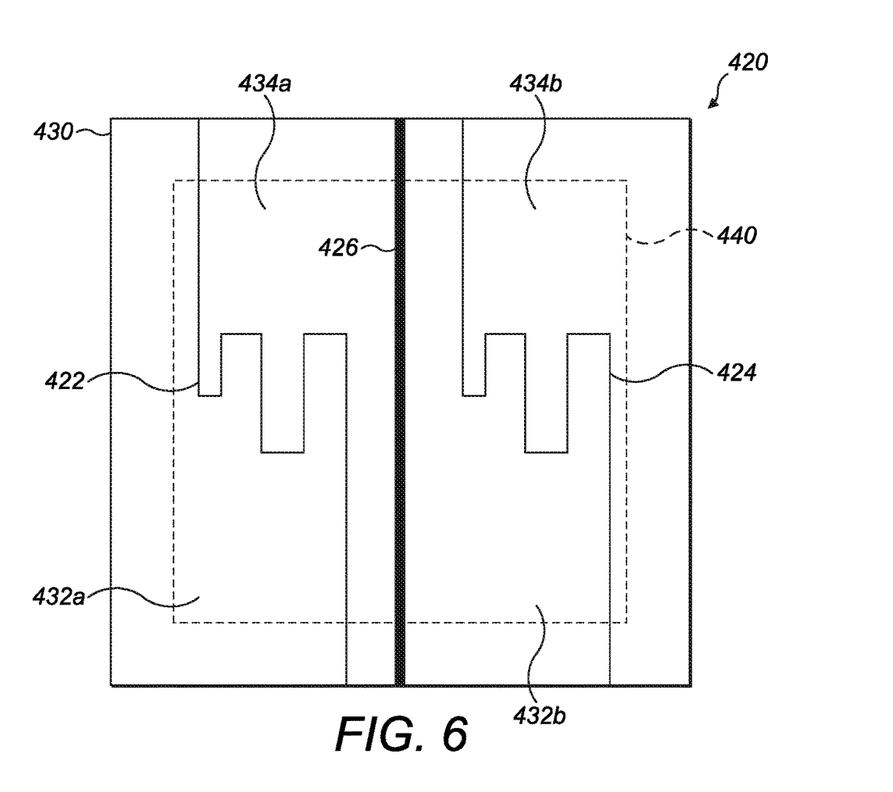
FIG. 6 is a plan view of another filter.

FIG. 6 shows a variation of the arrangement of FIG. 2a. The ion filter 420 comprises a monolithic electrode layer 430 which is divided into two sections by an insulating trench 426. In this arrangement, the continuous channel is replaced by two separate ion channel portions 422, 424; one in each section of the electrode layer. The channel portions are arranged side-by-side and divide the ion filter into two first and second electrode portions 432a,b, 434a,b. As in previous embodiments, each of the separate channel portions comprises a plurality of ion channels through which ions flow with the first channel portion comprising a plurality of first ion channels and the second channel portion comprising a plurality of second ion channels. The electrode layer 430 is supported on a substrate 440 which maintains the electrode sections and also the electrode portions in fixed alignment to ensure that the ion channel gap width is maintained. In FIG. 6, the first channel portion and 422 (and thus the first ion channels) is heated to a first temperature and the second channel 424 (and thus the second ion channels) to a second, different temperature. The two temperatures are selected to provide a resulting $E_C:E_D$ spectrum having two separate graphs which enable the desired chemical to be identified by the system.

Although a few preferred embodiments of the present invention have been shown and described, it will be appreciated by those skilled in the art that various changes and modifications might be made without departing from the scope of the invention, as defined in the appended claims.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. An ion filter for filtering ions in a gas sample, the ion filter comprising:
   a first ion channel for filtering ions from a target chemical in the gas sample at a first temperature;
   a second ion channel for filtering ions from the target chemical in the gas sample at a second temperature, wherein the second ion channel is separated from the first ion channel;
   a temperature control region in thermal contact with the first and second ion channels for controlling a difference in the first temperature and the second temperature between the first and second ion channels; and
   a single electrode layer,
   wherein each ion channel is located within the single electrode layer,
   wherein the temperature control region comprises a thermal insulator between the first and second ion channels for maintaining the difference in the first temperature and the second temperature, and
   wherein the gas sample passes through the first ion channel and the second ion channel simultaneously.

2. The ion filter of claim 1, further comprising a third ion channel for filtering ions from the target chemical in the gas sample, wherein the third ion channel is separated from the first ion channel and the second ion channel and the temperature control region is in thermal contact with the third ion channel for controlling a difference in temperature between the first, second and third ion channels.

3. The ion filter of claim 1, further comprising a continuous channel which divides the single electrode layer into first and second electrode portions, the continuous channel comprising a first ion channel portion defining the first ion channel, a second ion channel portion defining the second ion channel and a central channel portion connecting the first and second ion channel portions.

4. The ion filter of claim 3, wherein the thermal insulator is mounted to the central channel portion.

5. The ion filter of claim 1, wherein the thermal insulator comprises a trench which divides the single electrode layer into a first electrode section and a second electrode section, and wherein the first electrode section has a first ion channel portion defining the first ion channel and the second electrode section has a second ion channel portion defining the second ion channel.

6. The ion filter of claim 3, wherein the first ion channel portion comprises a plurality of first ion channels and the second ion channel portion comprises a plurality of second ion channels.

7. The ion filter of claim 3, further comprising a first funnel portion mounted to the single electrode layer, the first funnel portion being configured to channel gas flow at a first temperature into the first ion channel portion and a second funnel portion mounted to the single electrode layer, the second funnel portion being configured to channel gas flow at a second temperature into the first ion channel portion.

8. The ion filter of claim 1, wherein the temperature control region comprises a heating layer mounted to the single electrode layer, the heating layer comprising at least one heating element for controlling the temperature within the first and second ion channels.

9. The ion filter of claim 8, wherein the at least one heating element is aligned with the first ion channel and the second ion channel, and the heating element is configured to heat the first ion channel to the first temperature and the second ion channel to the second temperature.

10. The ion filter of claim 8, wherein the at least one heating element comprises a first heating element aligned at a side of the first ion channel and a second heating element aligned at a side of the second ion channel, and the heating element is configured to heat the first ion channel to the first temperature and the second ion channel to the second temperature.

11. The ion filter of claim 10, wherein the first ion channel is defined between a first pair of electrodes and the second ion channel is defined between a second pair of electrodes and the first heating element is aligned with one of the first pair of electrodes and the second heating element is aligned with one of the second pair of electrodes.

12. The ion filter of claim 8, wherein the temperature control region comprises a second heating layer mounted to an opposed face of the single electrode layer to the heating layer, the second heating layer comprising at least one heating element for controlling the temperature within the first and second ion channels.

13. The ion filter of claim 1, further comprising a plurality of ion channels between the first ion channel and the second ion channel wherein the temperature control region comprises a first heater mounted adjacent the first ion channel to heat the first ion channel to the first temperature and a second heater mounted adjacent the second ion channel to heat the second ion channel to the second temperature.

14. The ion filter of claim 1, further comprising a first electrode layer having the first ion channel and second electrode layer having the second ion channel wherein the temperature control region comprises a thermal insulator between the first electrode layer and the second electrode layer.

15. The ion filter of claim 14, further comprising a first heater adjacent the first ion channel to heat the first ion channel to the first temperature and a second heater adjacent the second ion channel to heat the second ion channel to the second temperature.

16. An ion mobility spectrometry system comprising:
   an ion filter as set out in claim 1;
   an ionizer for generating ions within the gas sample; and
   a detector for detecting an output from the ion filter.

17. A method of filtering ions from a target chemical in a gas sample, the method comprising:
   passing the gas sample through a first ion channel for filtering ions from a target chemical in the gas sample at a first temperature;
   passing the gas sample through a second ion channel for filtering ions from the target chemical in the gas sample at a second temperature; and controlling a difference in the first temperature and the second temperature between the first and second ion channels by a temperature control region that is in thermal contact with the first and second ion channels, wherein the second ion channel is separated from the first ion channel and is at a different temperature to that of the first ion channel, wherein each of the first and second ion channels is located within a single electrode layer, wherein the temperature control region comprises a thermal insulator between the first and second ion channels for maintaining the difference in the first temperature and the second temperature, and wherein the gas sample is passed through the first and second ion channels simultaneously.

* * * * *